March 23, 1937. G. J. HAYNES 2,074,469
COLLISION ABSORBER
Filed July 6, 1936
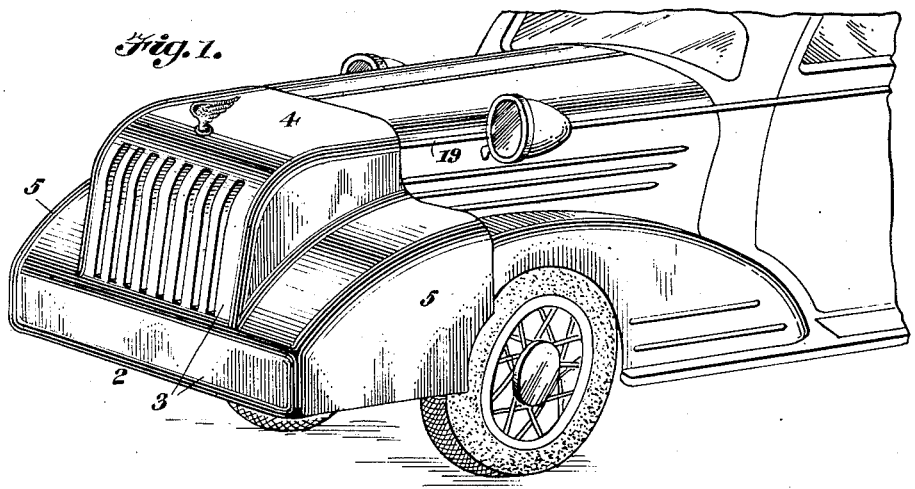
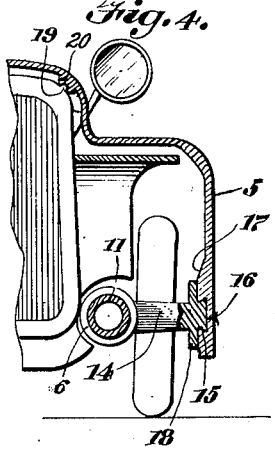
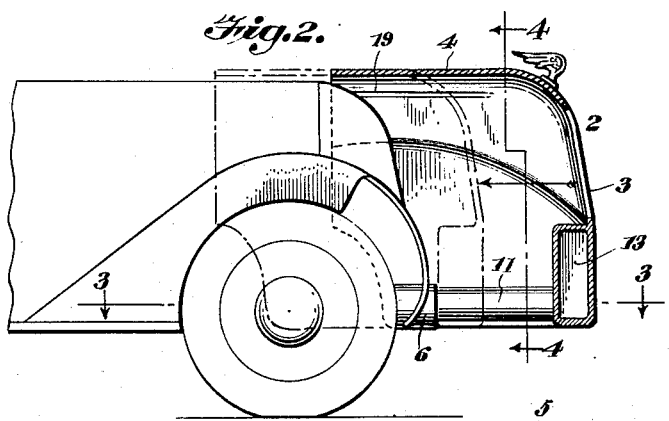
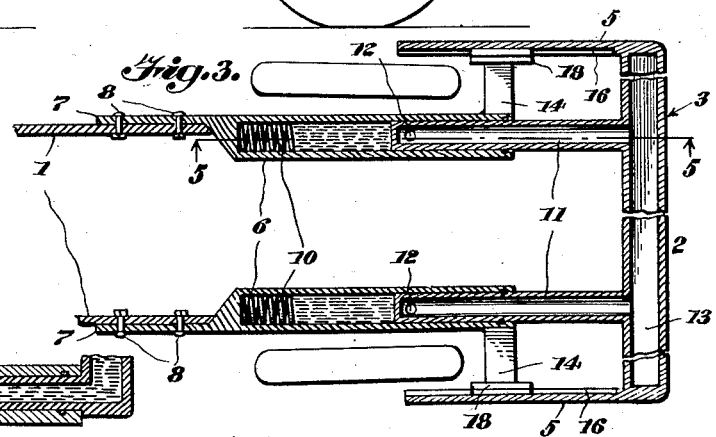
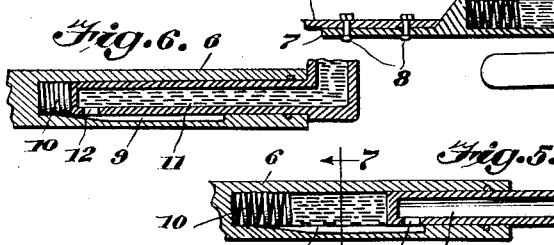
INVENTOR:
GLENN J. HAYNES.

Patented Mar. 23, 1937

2,074,469

UNITED STATES PATENT OFFICE 2,074,469

COLLISION ABSORBER

Glenn J. Haynes, Quantico, Va.

Application July 6, 1936, Serial No. 89,223

6 Claims. (Cl. 293—54)

This invention relates to a collision absorber.

An object of the invention is the construction of a simple and efficient means whereby practically the entire front portion of a motor vehicle is protected against injury from a collision.

Another object of the invention is the construction of a novel shield which will protect the radiator, front mud guards, wheels and steering mechanism from injury in the event of a collision.

A still further object of the invention is the construction of a simple and efficient collision absorbing shield for motor vehicles having its front portion of considerable depth and substantially vertical, with its sides extending over part of the motor vehicle to form a closed streamlined structure; the shield being movably supported in a suitable manner upon part of the motor vehicle.

With the foregoing and other objects in view, my invention comprises certain novel combinations, constructions and arrangements of parts as well be hereinafter fully described, illustrated in the accompanying drawing and more particularly pointed out in the appended claims.

In the drawing:

Figure 1 is a perspective view of a collision absorber constructed in accordance with the present invention, showing the same applied to a motor vehicle, while Figure 2 is a vertical central longitudinal sectional view of the same.

Figure 3 is a horizontal sectional view taken on line 3—3 Fig. 2, and looking in the direction of the arrows.

Figure 4 is a vertical sectional view taken on line 4—4 Fig. 2, and looking in the direction of the arrows.

Figure 5 is a longitudinal sectional view taken on line 5—5 Fig. 3, and looking in the direction of the arrows.

Figure 6 is a longitudinal sectional view of one of the cylinders showing its piston or plunger in its innermost position therein.

Figure 7 is a sectional view taken on line 7—7 Fig. 5, and looking in the direction of the arrows.

Referring to the drawing, in which I have shown the preferred embodiment of my invention, 1, 1 designate parts of a motor vehicle, constituting a support, to which my novel collision absorber is attached.

My collision absorber comprises a shield 2 which substantially incloses the entire front part of the motor vehicle as is clearly shown in Figure 1. This shield 2 includes the relatively vertical front portion 3 that is of considerable depth, whereby a head-on blow, such as a collision with an object, is better absorbed with a minimum amount of injury to the mechanism. The top portion 4 of the shield 2 extends back over the front part of the motor vehicle, producing an excellent stream-line effect, as seen in Figure 1. The sides 5 of the shield overhang the mud guards and the wheels of the motor vehicle, whereby a side blow or contact will not injure the mud guards, wheels and their tires, nor the steering mechanism.

Two cylinders 6 are employed, each preferably provided with rearwardly-extending extensions 7, which extensions are positioned against suitable parts of the motor vehicle or support 1, and fastening means 8 are employed (Fig. 3) for securing my mechanism to the support. Each cylinder 6 is provided with a groove 9; groove 9 (Figs. 5 and 6) tapers towards its left end for the purpose hereinafter described. A coil spring 10 is placed in each cylinder 6, at the left end thereof. A hollow plunger 11 extends into each cylinder 6. Each plunger 11 is provided with an inlet and an outlet aperture 12 near its inner end. The outer end of each hollow piston or plunger 11 opens into an upwardly-extending air chamber 13 formed on the shield 2. This air chamber 13 extends across the front portion of the shield and a considerable distance up the inner face of the front portion 3 of said shield (Figs. 2 and 3). Horizontal braces 14 are secured at their inner ends to the outer ends of cylinders 6. Each brace 14 is provided on its outer end with a dovetail tenon 15 that slides in dovetail groove 16 formed in the enlarged portion 17 of the side portion 5 of the shield. Contiguous to each tenon 15, on brace 14, is a reinforcing flange 18 that bears against the inner face of enlarged portion 17, which produces a strong endurable structure. It is to be understood that if a side blow occurs on the shield, the strong braces 14 will prevent the shield from being materially bent or injured, whereby the wheel and other contiguous parts of the motor vehicle will be efficiently protected.

If it is desired the stability of the movable shield 2 upon the motor vehicle can be further increased by utilizing ornamental rib or bead 19 at each side of the motor vehicle, by having an inwardly extending grooved portion 20 engaging rib 19 (Fig. 4).

It will be seen that in this preferred embodiment of my invention, the cylinders 6 with braces 14 are held stationary upon the support 1 (Fig.

3) whereas shield 2 and its hollow plungers 11 are slidably mounted thereon.

In its normal condition (Fig. 3) the collision absorber contains oil in the cylinders 6 while in the hollow plungers 11 and reservoir or chamber 13 is air at low pressure. Air is injected from time to time into plungers 11 and chamber 13 by any suitable air valve construction, not shown, such as an ordinary air valve used on pneumatic tires.

In operation when the plungers 11 are driven in by force of collision, the oil in the cylinders 6 will be driven through apertures 12 into the low pressure air chambers formed by hollow plungers 11, and the air is then forced into the large vertically-extending air chamber 13. For returning, the low pressure air in said chambers, as soon as the impact is removed, will push or force oil contained in said chambers back through apertures 12 into cylinders 6. The coil springs 10, when the plungers are in the position shown in Figure 6, materially assist to start the return of the plungers to their outer position, as soon as the strain of collision or impact is removed. For blows involving plunger travel in flat part of groove 9, the impact will be uniformly retarded from maximum to zero. For blows in excess of said plunger travel, the impact will be reduced to zero by the time the inner end of the plunger moves to the inner end of the graduated groove 9, as shown in Figure 6. It is understood that the air in the plungers and chambers is under sufficient pressure to return the apparatus to its normal position, with substantially all of the oil forced out of the plungers and back into the cylinders as clearly seen in Figures 3 and 5. In the event the impact is very great the plungers will be driven to the ends of the oil grooves (Fig. 6) thus giving a positive oil-sealed stop at a fixed point. Then, as hereinbefore mentioned, as soon as the impact pressure is released the springs 10 will break the oil seal, and let the plungers return to their original position (Fig. 5).

It is to be understood that my principle of a collision absorber may be applied equally as well to the rear of a motor vehicle (not shown) to prevent injury to the back or rear of the motor vehicle, in case of a rear-on collision, backing into an object, etc.

While I have described the preferred embodiment of my invention and illustrated the same in the accompanying drawing, minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a mechanism of the class described, the combination with a support, of cylinders carried by said support, braces extending laterally from said cylinders, a shield provided with plungers extending into said cylinders, said shield also provided with rearwardly-extending portions for overhanging wheels, and means slidably connecting said rearwardly-extending portions directly to said braces.

2. In a mechanism of the class described, the combination with a support, of cylinders mounted on said support, each cylinder provided with a groove tapered at one end, a shield provided with hollow plungers, said plungers provided with apertures, and said plungers in said cylinders with said apertures in communication with the grooves of the cylinders.

3. In a mechanism of the class described, the combination with a support, of cylinders mounted on said support, each cylinder provided with a groove tapered at one end, a coil spring in each cylinder at the tapered end of the groove, a shield provided with hollow plungers adapted to be forced inwardly against said coil springs, and each plunger being provided with an aperture in communication with a groove.

4. In a mechanism of the class described, the combination with a support, of a shield provided with an air chamber and with hollow plungers communicating with said air chamber, and said support provided with means slidably mounting said hollow plungers thereon.

5. In a mechanism of the class described, the combination with a support, of a shield provided across its entire front portion with an upwardly extending air chamber, rearwardly extending hollow plungers in communication with said air chamber, and said support provided with means slidably mounting said hollow plungers thereon.

6. In a mechanism of the class described, the combination with a support, of cylinders fastened at their inner ends to said support, each cylinder provided at its outer end with an outwardly extending horizontal brace, said brace provided at its outer end with a dovetail tenon and with an integral reinforcing flange contiguous to said tenon, a shield provided with plungers extending into said cylinders, said shield provided on its sides with enlarged portions, each enlarged portion being provided with a dovetail groove, and said dovetail tenons in said dovetail grooves with said reinforcing flanges bearing against said enlarged portions, substantially as shown and described.

GLENN J. HAYNES.